United States Patent [19]
Osborn

[11] 3,902,378
[45] Sept. 2, 1975

[54] STRAIGHT-LINE SHIFTING ASSEMBLY

[75] Inventor: Charles H. Osborn, Spring Lake, Mich.

[73] Assignee: Grand Haven Stamped Products Company, Grand Haven, Mich.

[22] Filed: Mar. 14, 1974

[21] Appl. No.: 450,978

[52] U.S. Cl. .................... 74/475; 74/477; 180/44 R
[51] Int. Cl.² . G05G 5/10; G05G 9/08; B60K 17/34
[58] Field of Search .......... 74/473 R, 475, 477, 491; 180/44 R

[56] References Cited
UNITED STATES PATENTS

| | | | |
|---|---|---|---|
| 2,961,890 | 11/1960 | Marshall | 74/477 |
| 3,018,670 | 1/1962 | Lohn | 74/477 |
| 3,765,261 | 10/1973 | Hobbins | 74/477 |

Primary Examiner—Allan D. Herrmann
Attorney, Agent, or Firm—Price, Heneveld, Huizenga & Cooper

[57] ABSTRACT

A shifting assembly in which a shifting stick is moved in a straight line to control gear range and differential operation of a transfer case in a four wheel drive vehicle. A pair of lever arms operable by a single shifting stick actuate the transfer case mechanisms. A gear range lever arm shifts the transfer case between high, neutral, and low gear positions while a differential lever arm is shiftable from a first position to a second to lock the differential mechanisms. Special cam slots in the lever arms are engageable with a pin on a selector arm movable by the shifting stick. A link, operable by the pin with movement of the shifting stick, pivots to effect movement of the differential lever arm while simultaneously disengaging from the range lever arm.

21 Claims, 7 Drawing Figures

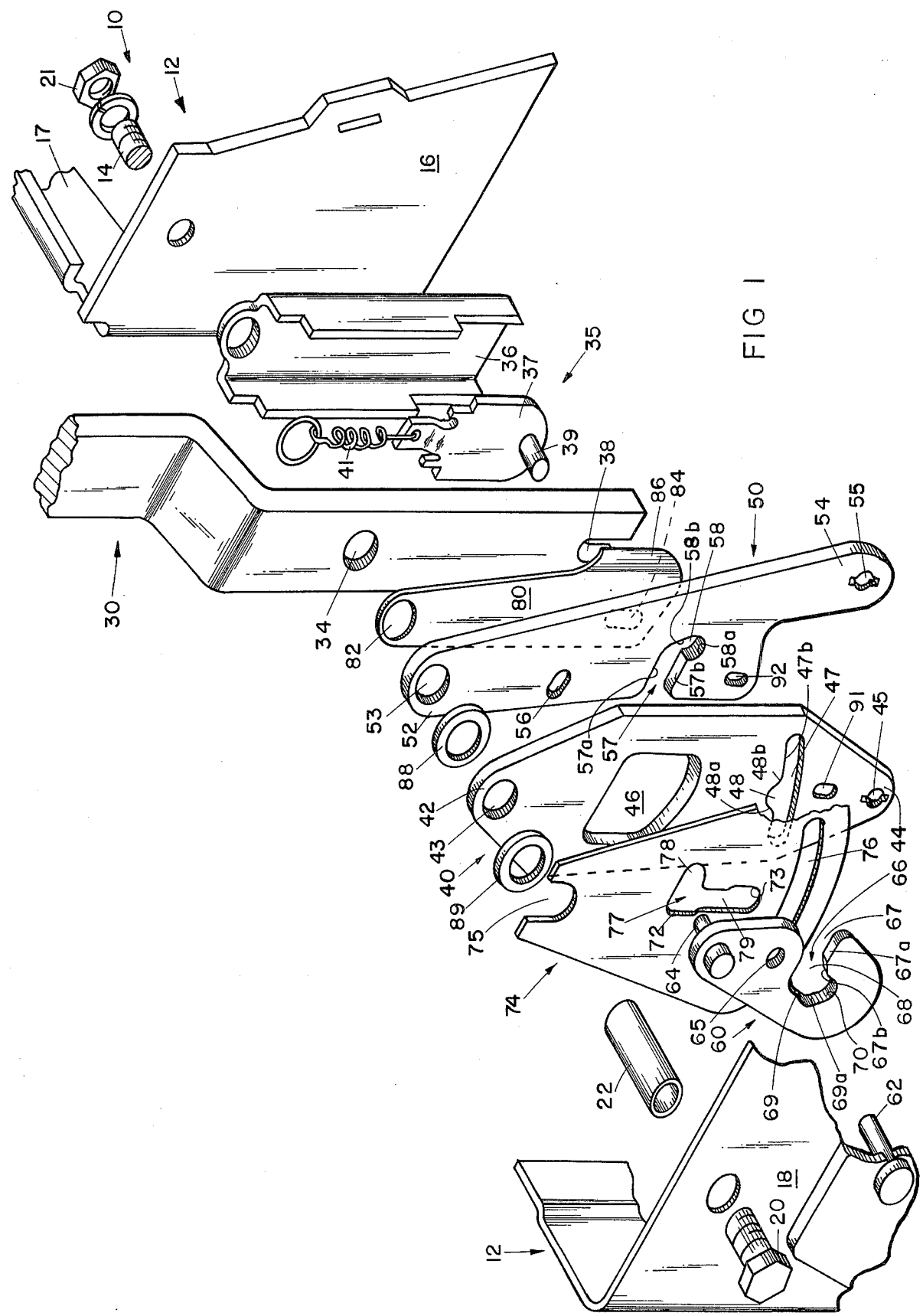

STRAIGHT-LINE SHIFTING ASSEMBLY

BACKGROUND OF THE INVENTION

In four wheel drive vehicles having "full time" four wheel drive such as recreational vehicles and the like, a transmission and a transfer case are provided for effecting connection between engine output to the front and rear wheels of the vehicle. Such vehicles are used both on-the-road and off-the-road. During on-the-road use, a differential drive must be provided so that slippage may occur between the front and rear axles to prevent excessive wear of tires and related problems. In off-the-road applications, it is desirable that the differential be locked such that the driving power is applied to both axles.

The transfer case includes a pair of control elements shiftable into several positions. A first element is movable in one direction for high gear range drive and in a directly opposite direction to low gear range drive position. The other element is moved to provide the differential locking function. These elements are operated by a manually operated shifting stick. Ideally, the shifting stick is movable in a straight line to effect movement of the elements on the transfer case. Since movement of the control elements is separate and in one gear range is in the opposite direction from movement of the differential locking function element, the manually operated shifting arrangement has been extremely complicated both from an operator's standpoint and also because of the expense involved in constructing such shifting mechanisms. Heretofore, such shifting assemblies were complicated in construction and required a great many component parts.

In the prior art, various control mechanisms have been proposed. One such mechanism is shown in U.S. Pat. No. 3,765,261 issued Oct. 16, 1973 entitled UNITARY STICK TRANSFER CASE SHIFTER. Systems of this type, are very complicated and expensive to manufacture and maintain. It is necessary to "program" and limit the travel of the shifting levers by means of cam slots in the housing of the shifter to match with a follower on the shifting stick. In addition, systems of this type are oftentimes subject to "locking up" wherein they will lock in a position and can only be shifted out of that position by physically grasping the shifting linkages at the transfer case and moving them into a neutral position.

SUMMARY OF THE INVENTION

The present invention relates to a straight line shifting assembly for transfer case mechanisms in a full time four wheel drive vehicle. A single shifting stick is operable to selectively manipulate a pair of actuating shafts or levers on a transfer case mechanism by movement of the shifting stick through a straight line. The shift assembly includes a pair of lever arms, one of which is shiftable between "high", "neutral" and "low" gear range positions. The other lever arm is shiftable between differential locked and unlocked or operative position. When the first lever arm is moved to high gear range or in the opposite direction to low gear range position, the differential lock position may be engaged by shifting the second lever arm. The direction of travel of the second lever arm into the differential lock position remains the same in each case while the first lever must be reversed in direction to shift from high to low gear range position.

In the present invention, the gear range lever arm, the differential shifting lever arm and a selector arm arm mounted about a common axis. The selector arm, movable by a shifting stick, is arranged for movement in a straight line. The lever arms include specially configured cam slot surfaces which are selectively operated on by a follower member carried by the selector arm. Special linking means on the housing and operatively connected to the differential shift lever arm also includes a camming surface engageable by the follower member to selectively shift the differential lever arm. The cam surfaces in the lever arms and the link are specially configured to eliminate problems existent in the prior art structures specifically binding and "lock-up" and to provide also for a smooth yet precise transition between the several selected positions. The invention further includes a special restrictor or guide plate member vertically shiftable with movement of the selector arm into any one of the selected positions. The restrictor plate insures precise alignment of the several components of the shift assembly to insure that alignment of the shifter and the transfer case mechanisms is maintained during operation. The restrictor plate and the special camming surfaces cooperatively operate with the followr on the selector arm to also insure against misalignment and lock-up of the shifting assembly.

The many objects, features, and advantages of this invention will become readily apparent to those skilled in the art from a consideration of the following description when taken in connection with the accompanying drawings.

BRIEF DESCRIPTION OF THE DRAWINGS

FIG. 1 is an exploded view of the straight-line shifting assembly of the present invention;

DESCRIPTION OF THE PREFERRED EMBODIMENT

Figure 3:
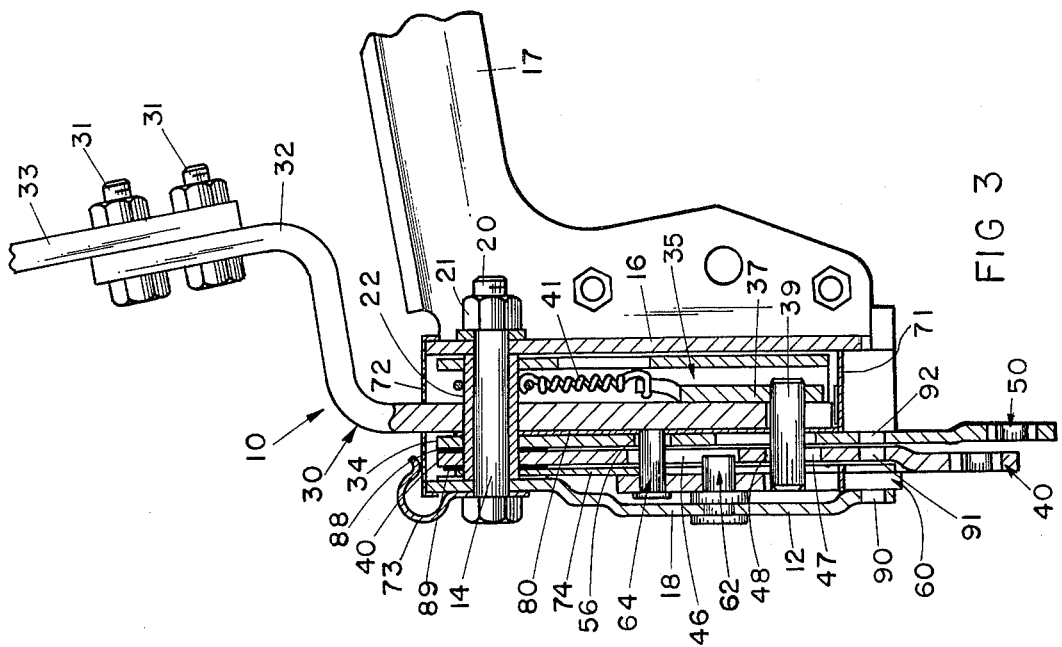
FIG. 3 is a cross-sectional view taken generally along the plane III—III of FIG. 2.
Figure 2:
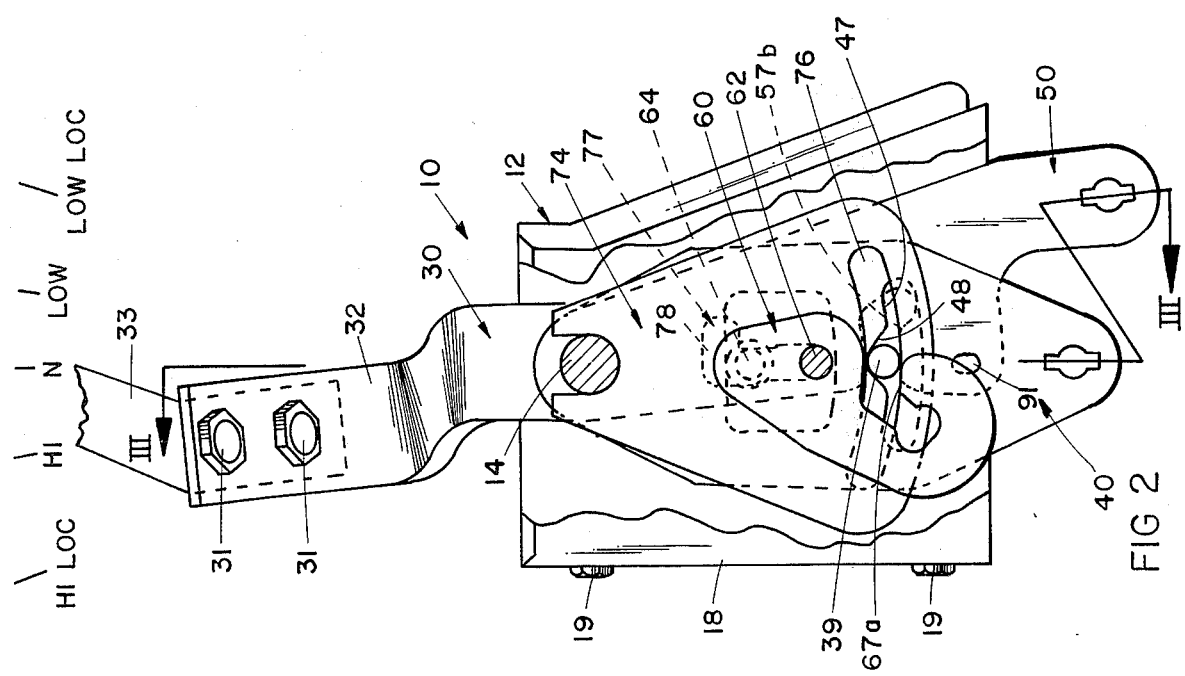
FIG. 2 is a plan view, partially broken away, illustrating the shifting mechanism in a neutral position.

Referring now to the drawings and in particular to FIGS. 1, 2 and 3, the shift assembly of the invention generally designated by the numeral 10 includes a housing 12, a pivotally mounted selector arm assembly 30 and a pair of pivotally mounted shifting lever arms 40 and 50. Lever arm 40 is arranged for movement about a pivot 14 through three positions to shift the transfer case gearing from neutral in a first direction to a high gear range "HI" position and in an opposite direction from neutral to a low gear range "LO" position. Differential shift lever arm 50 is rotated about pivot 14 to move the transfer case mechanisms between a differential locked "LOC" and unlocked or operative position in either high or low range as selected by gear range shift arm 40. The differential shift lever 50, gear range shift lever 40 and selector arm assembly 30 are mounted in housing 12 for movement about a common axis formed by pivot shaft 14. A link member 60 is pivotally mounted on the housing below the center line of pivot shaft 14 on a pivot stud 62. Link 60 includes an outwardly extending pin 64 which is adapted to engage differential shift lever 50 to move same in response to movement of selector arm assembly 30 as will be hereinafter described.

Housing 12 is generally of a two-piece construction having a mounting side 16 which includes an outwardly extending flange 17 adapted for securement to the framework of a vehicle in the vicinity of its transmission and transfer case. A cover 18 forms the opposite wall of housing 12 and is secured thereto by bolts 19 (FIG. 2) to form an enclosure for the selector arm assembly 30, lever arms 40 and 50, and link 60. The housing is generally closed having openings at the top and bottom thereof to accommodate the outwardly extending selector arm assembly 30 and levers 40 and 50. A bolt 20 extends through housing 12 at an upper portion thereof and is retained by a lockwasher and nut 21. A bushing 22 forms the pivot shaft 14 upon which selector arm assembly 30 and actuator levers 40 and 50 are rotatably supported.

Selector arm assembly 30 is a generally elongated curved strap having fastening means 31 at its upper portion 32 for connection to a shifting stick 33. The arm assembly extends downwardly into the housing and includes an opening 34 therein by which it is mounted on bushing 22 for rotation about pivot shaft 14. The lowermost extremity of the selector arm, generally designated by the numeral 35, is formed to include a channel-like enclosure 36 in which a selector plate 37 is slidably mounted. A slot 38 extends upwardly from the lower end of the selector arm to allow vertical movement of an outwardly extending selector pin 39 fixed to selector plate 37. Selector plate 37 and pin 39 carried thereby are biase upwardly with respect to the selector arm by means of a bias spring 41 connected at one end to selector plate 37 and at its opposite end secured about pivot shaft 14.

The gear range lever 40 is generally rectangular in shape having somewhat rounded ends. The upper end 42 has an opening 43 provided therein for mounting the lever 40 on bushing 22 to pivot about shaft 14. The opposite or lower end 44 is provided with a conventional key-shaped opening 45 for connection to linkage arms and to the transfer case (not shown) in a manner well-known to those skilled in the art. An enlarged central rectangular opening 46 is provided to accommodate arm 64 on link 60 as will be hereinafter described. An elongated cam slot 47 is centrally located in lever 40 between cut-out 46 and key-shaped opening 45. Cam slot 47 is arcuate in shape, its arcuate dimensions being generated from opening 43 at the upper end of the lever arm. Cam slot 47 includes an upwardly extending detent or recess 48 in the central upper portion. Recess 48 is in nearly vertical alignment with pivot opening 43, key opening 47 and an alignment opening 91. Slot 47 and detent 48 are adapted to receive selector pin 39 on selector plate 37.

The sidewalls forming the entrance to detent 48 are designated 48a and 48b. The sidewalls 48a and 48b are preferably formed at different angles with respect to the vertical. Wall 48a has an angle of approximately 37° while wall 48b has an angle of 40°. The transition area between walls 48a and 48b and the upper wall surface 47b of slot 47 is preferably very sharp. The sharp transition and angular wall surfaces cooperate with the selector pin 39 to provide positive centering of lever arm 40 with respect to lever arm 50 when moved from a differential locked position to operative position and to a neutral position as will be further described hereinafter.

The differential shift lever arm 50 has an upper portion 52 in which an opening 53 is provided for mounting on bushing 22 to pivot about pivot shaft 14. Lower end 54 is provided with a key-shaped opening 55 for connection to linkage arms (not shown) and to the transfer case. A pivot pin mounting opening 56 is spaced downwardly from pivot opening 53 to receive arm 64 of link 60. Opening 56 is an elongated slot arranged at an angle of about 37° with respect to the vertical to allow slight lateral displacement of arm 64 on link 60 during shifting functions. As shown in cross section in FIG. 3, arm 64 extends through rectangular opening 46 in gear range lever 40 and extends into opening 56 in differential shift lever 50. A cam slot 57 (FIG. 1) extends inwardly and downwardly from one side of lever 50 midway between pivot pin opening 56 and key-shaped opening 55. A downward extension of cam-slot 57 is designated by the numeral 58. Cam slot 57, its extension 58, in lever arm 50 and cam slot 47 and its detent 48 in lever arm 40 are arranged in general alignment with respect to each other and are cooperatively adapted to receive and for operation by selector pin 39 on selector plate 37.

In a preferred embodiment, sidewalls 58a and 58b forming the downwardly extending portion 58 of cam slot 57 are at established angles with respect to a vertical line drawn through opening 53, an alignment opening 92 and pivot pin opening 56. Preferably, in one embodiment, wall surface 58a is at an angle of 47° to the vertical and wall 58b is arranged at 33° to the vertical. The angles specified may be changed depending upon the particular characteristics of the vehicle in which the shifter assembly is installed. The wall surface 57b forming the lower cam surface at the entrance opening is generally arcuate in shape and its dimensions are generated from opening 53 at the upper end of the lever arm. Wall surface 57b cooperates with selector pin 39 during certain shifting functions of the assembly to prevent the selector pin and the lever upon which it is acting at that time, from becoming misaligned to thereby prevent the problem known in prior art shifters as "lock-up."

Link 60 is somewhat C-shaped in configuration having arm 64 fixed at its upper portion and a pivot opening 65 positioned below arm 64 and opening 65 provides a means by which the link is pivotally mounted on pivot stud 62 extending inwardly from cover 18 of housing 12. The lower portion of the link includes a curved hook-shaped portion having a cam slot 66 formed therein. Cam slot 66 includes a series of steps opening inwardly from one side. A generally horizontal cut-out area designated by the numeral 67 extends angularly downwardly into an area designated 68 which is formed by an intermediate wall area 69. The slot then slopes downwardly to the bottom portion forming a pocket 70. Cam slot 66 is in general alignment with cam slots 47 and 57 on lever arms 40 and 50 respectively, and is similarly adapted to receive pin 39 on selector plate 37. The wall surfaces forming cam slot 66 are also carefully arranged similar to the cam slots 47 and 57 in lever arms 40 and 50, respectively. The wall surfaces forming cam slot 66 are arranged to receive selector pin 39 for operation thereby during shifting of lever arm 50 into a low gear range, differential locked position.

A dust cover 72 (FIG. 3) closes the upper opening of the housing and is retained by means of a spring clip 73. A similar dust cover 71 and suitable retaining means are provided at the lowermost opening of the housing.

A restrictor or guide plate 74 (FIG. 1) is located between lever arm 40 and link 60. Restrictor plate 74 is generally triangular in configuration having a vertical slot 75 at its apex to allow vertical movement of the restrictor plate with respect to the housing. Slot 75 embraces bushing 22 on pivot shaft 14. An arcuate cut-out 76 along the base portion of the restrictor plate is substantially in alignment, when assembled, with cam slots 47 and 57 in levers 40 and 50. An inverted L-shaped cut-out 77 in the central portion of the restrictor plate provides clearance for arm 64 on link 60 as it passes through the restrictor plate, rectangular opening 46 in actuator arm 40, and into elongated slot 56 in lever 50. The restrictor plate serves to guide the movement of arm 64 and as it moves with selector pin 39 with movement of the selector arm assembly 30 and also with movement of lever arm 50 during differential shifting operations. A light coating of suitable lubricant is provided on the surfaces of the restrictor plate at its interface with actuator arm 40 and link 60 to prevent binding.

By restricting movement of link 60 and arm 64 carried thereby the differential shift lever 50 is prevented from movement into the differential locked positions independently of movement of the selector arm assembly 30. In the absence of the restrictor plate this could occur, if during vehicle travel an obstruction in the terrain should strike the differential lock lever 50 and force it out of its selected position without a corresponding movement of the selector lever 30. When this occurs, it is necessary to physically grasp the actuator levers and move them into the selected position such that shifting can be effected through the selector lever in the normal manner. An additional feature of the restrictor plate is to obstruct the alignment of openings 91 and 92 in levers 40 and 50 respectively with alignment opening 90 in housing 12 during assembly and installation of a vehicle if the levers are not in a neutral position.

Cut-out portion 77 includes an upper or horizontal leg 78 which guides and allows movement of arm 64 in opening 56 of lever 50 during rotation thereof. The lower vertical leg 79 allows vertical movement of the restrictor plate about arm 64 when the shifter is in a neutral position and during shifting of lever arm 40 into either high or low gear range positions. The sidewall of vertical leg 79 opposite horizontal leg 78 has a slight step or recess 72 formed therein while the opposite sidewall has a similar step or recess 73 located at its lower end. Vertical leg 79 and its steps 72 and 73 formed in its sidewalls allow limited movement of link 60 as arm 64 abuts the sidewalls during shifting of lever arms 40 and 50 into position. Restrictor plate 74 has as its primary purpose the restriction or limiting of movement of link 60 to thereby prevent lock-up or other malfunction of the shifting assembly during operation.

A separator plate 80 having an opening 82 in its upper surface and an enlarged elongated slot 84 in its lower end is also positioned over bushing 22 on pivot shaft 14 to extend upwardly between selector arm assembly 30 and lever arm 50. Selector pin 39 passes through slot 84 and into the arcuate-shaped cam cutouts in the lever arms 40, 50 and link 60. One side of the separator 80 is curved as indicated at 86 and overhangs one side of actuator arm 50 to provide a ramp or guide when selector arm 30 is moved toward and over lever arm 50 to prevent binding.

A pair of thin resilient washers 88 and 89 positioned over bushing 22 on each side of gear range shift lever arm 40 take up tolerances between the several components positioned within the housing on bushing 22. The washers commonly called wave or spring washers prevent rattling of the parts within the housing.

Alignment openings 91 and 92 in levers 40 and 50, and an opening 90 (FIG. 3) in housing 12 accommodates an alignment pin (not shown) for positioning the gear range shift lever arm 40 in a neutral position and differential shift lever arm 50 in an unlocked or differential operative position for preliminary adjustment of the various shifting linkage mechanisms connected to the transfer case when the shifter assembly is installed in a vehicle. When the assembly is to be positioned on a vehicle, alignment openings 90 and 92 are set in alignment with openings 91 in housing 12 and held by means of an alignment pin (not shown). If, during assembly of the shifter differential lever 50 was inadvertently positioned in other than a neutral or unlocked position, the restrictor plate will move downwardly and the lower portion thereof (below slot 76) will effectively cover the area behind opening 90 in housing 12 to thereby prevent the insertion of the alignment pin thereby signifying to the assembler that the shifter is not properly positioned in neutral position for installation in the vehicle.

OPERATION

Figure 4:
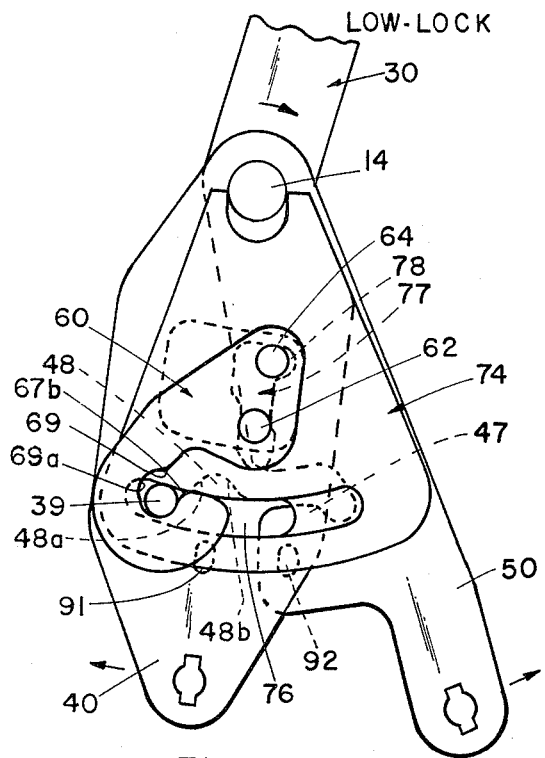
FIG. 4 is a somewhat simplified plan view illustrating the shifting levers in a low gear range, differential locked position.
Figure 5:
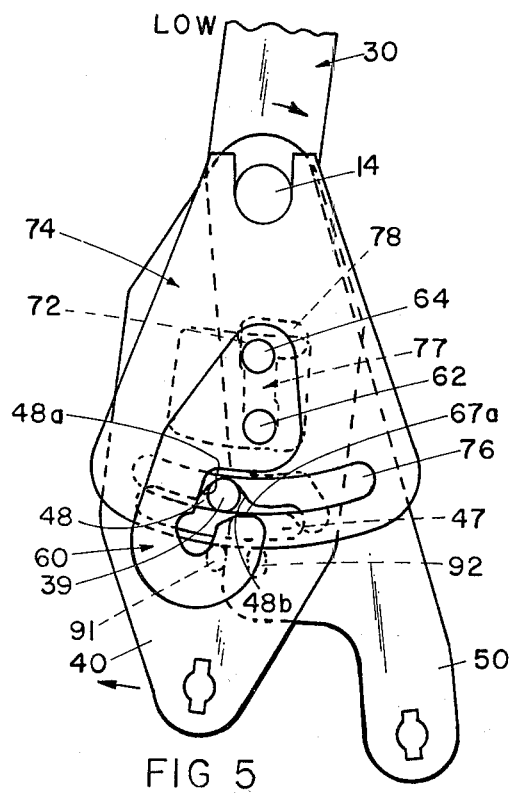
FIG. 5 is a simplified view similar to FIG. 4 illustrating the lever arms in a low gear range, differential operating position.
Figure 6:
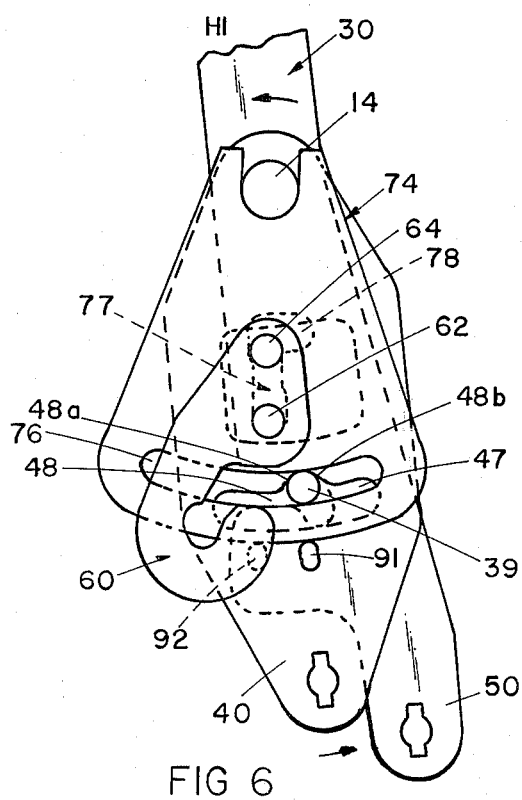
FIG. 6 is a view similar to FIGS. 4 and 5 illustrating the levers in a high gear range, differential operating position.

Referring to FIGS. 4–7, the operation of the shift assembly will be described in greater detail with reference to the simplified illustrations. Basically, the shifter is adapted to move to either of two positions on either side of the neutral position shown in FIG. 2. From neutral as the shifting stick is moved forward, i.e., to the left, the first position from neutral assumed by lever arm 40 is the high gear range position shown in FIG. 6. Gear range shift lever 40 is moved to this position by selector pin 38 acting on lever arm 40 by abutment of pin 39 with the wall surfaces 48b of detent 48 in lever arm 40. As illustrated in FIG. 6, lever arm 40 has moved to the right as it pivots about pivot shaft 14 with movement of selector arm 30 to the left.

Figure 7:
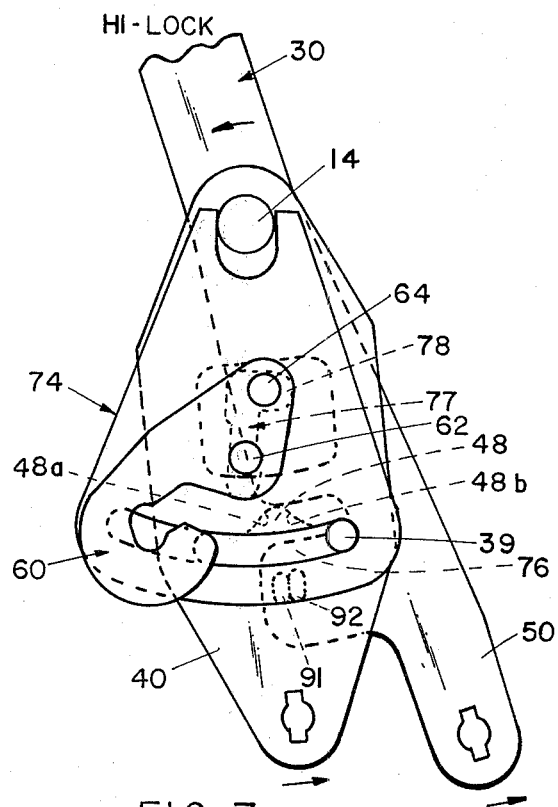
FIG. 7 is a view similar to FIGS. 4, 5, and 6 illustrating the lever arms in a high gear range, differential locked position.

With reference to FIG. 7, to lock the transfer case differential when in high gear range position, selector arm 30 is moved to the extreme left thereby causing selector pin 39 operating against the bias of spring 41 to shift downwardly along wall 48b and into cam slot 47. Simultaneously restrictor plate 74 is shifted and selector pin 39 enters the space between walls 57a and 57b of cam slot 57 in lever arm 50. Pin 39 travels along cam slot 57 into abutment with wall 58b and into recess 58 urging lever arm 50 to the right into the position shown in FIG. 7 to thereby shift the linkages (not shown) operating the differential locking mechanism in the transfer case.

Movement of selector arm assembly 30 in the opposite direction from neutral (to the right as viewed in the figures) serves to shift the mechanisms into the low gear range (FIG. 5) and low gear range, differential locked position (FIG. 4). In FIG. 5, pin 39 operating against the wall surface 48a of recess 48 with movement of selector arm 30 urges gear range lever arm 40 to pivot to the left thereby shifting the transfer case mechanisms into the low gear range position. The lever arm 50 at this time remains in the neutral position. The action of selector pin 39 is similar to that described in connection with FIG. 6 and restrictor plate 74 is in its upward position.

Referring to FIG. 4, continuous movement of the selector arm 30 to the right to lock the differential in the low gear range position, shifts the differential shift lever arm 50 to the right. This movement is transmitted to lever arm 50 in the opposite direction to the movement of gear range lever arm 40, through link 60. As previously mentioned, link 60 is pivotally mounted on stud 62 on fixed housing and its arm 64 extends into elongated opening 56 in lever 50. As selector arm 30 is moved, pin 39 travels along the length of cam slot 47 in lever arm 40 and simultaneously enters into cam slot 66 in link 60, (FIG. 1). Restrictor plate 74, is biased downwardly at this time by pin 39 in slot 76 as guide pin 39 enters the horizontal cut-out entrance 67. As pin 39 enters cam slot 66, it smoothly follows along the entrance portion 67 following generally along surfaces 67a and 67b with slight clearance at rear wall 69 until it engages the rear wall at a pocket-like detent 69a at the angular portion 68 of the slot causing the link to pivot about stud 62. This pivoting of link 60 causes a corresponding movement of arm 64 in opening 56 in actuator arm 50. Continued movement of pin 39 to the left with movement of selector arm assembly 30 moves the pin further along the recess into pocket 70 pivoting the link about pivot stud 62, moving arm 64, to cause a corresponding movement of differential shift lever arm 50 to the right thereby shifting the linkages connected to the transfer case into the differential locked position. Returning the selector arm assembly to the neutral position causes pin 39 to engage the right sidewall 67b of pocket 70 pivoting link 60 about stud 62, the arm 64 urges lever arm 50 back to the neutral position as pin 39 follows along the cam slot in the link.

Restrictor plate 74 follows the selector pin 39 during shifting operations. As noted previously, L-shaped slot 77 includes stepped portions 72 and 73 to allow limited movement of link 60 as arm 64 abuts the wall of cut-out 77 during shifting. When returning the shifting assembly toward a neutral position from differential locked position, (FIGS. 4 & 7) arm 64 is originally positioned in horizontal leg 78 of cut-out 77 and with movement abuts the sidewall at step 72 (FIGS. 5 & 6). This abutment occurs slightly before the vertical upward movement of restrictor plate 74 as it is shifted by the entrance of selector pin 39 into detent 48. As selector pin 39 enters detent 48, restrictor plate 74 is shifted upwardly causing vertical leg 79 of the cut-out 77 to embrace arm 64 to thereby prevent rotation of link 60 during subsequent movement of selector arm 30 into other positions. This positioning of arm 64 in vertical leg section 79 of cut-out 77, by preventing movement of link 60 holds it in position to thereby prevent any movement of differential shift lever arm 50 into lock position independent of movement caused by selector arm 30 and selector pin 39.

If the restrictor plate 74 were removed from the assembly, it would be possible, under certain conditions, for the differential shift lever arm 50 to be moved to a locking position by a force acting on the lever arm independent of movement of selector arm 30. This could occur when the gear range lever arm 40 is positioned in either the neutral (FIG. 2) positioned or in high (FIG. 6) position. The abutment of selector pin 39 with surface 67a of the link 60 does, however, prevent such movement of lever 50 when the shifting assembly is in the low range, differential unlocked position shown in FIG. 5.

An additional feature of the invention resides in the overlapping surfaces on differential lever arm 50 and on link 60 when gear range lever arm 40 is shifted from neutral to high and low positions. When the assembly is in the neutral position of FIG. 2 and with additional reference to FIG. 1, it will be noted that selector pin 39 is positively prevented from entering into the cam surfaces of the differential lever 50 and link 60 until after complete movement of gear range lever into high or low position has been effected.

With movement of gear range lever 40 to high and low positions, the selector pin 39 is operatively connected to lever arm 40 by means of its positioning in recess or detent 48. When shifted into differential locked position, pin 39 is operatively connected to differential lever 50 by being selectively positioned in either the recess or pocket 70 in link 60 (FIG. 4) or alternately, in the other direction of movement, in the recess or pocket 58 in lever arm 50 (FIG. 7). The overlapping surfaces 57b on differential lever 50 and 67a on link 60 are, when shifting from neutral to high and low positions, located below pin 39 in recess 48 and prevent pin 39 from disengagement with recess 48. This prevents pin 39 from engaging and hanging up between the differential lever arm and the link as the pin is moved into recesses or pockets 58 and 70 with shifting into differential locked position.

The angular walls 48a and 48b of detent 48 as previously described are of slightly different angular relationships and serve to guide the selector pin into detent 48 while shifting from differential locked positions in either high or low gear range. As selector pin 39 moves along cam slot 47 toward detent 48 from differential lock position, as it nears the central portion of detent 48, pin 39 will snap into place as it reaches walls 48a and 48b. The slope of wall 48b (40°) is slightly greater than wall 48a (37°) to maintain essentially the same "feel" on both sides as the selector pin 39 enters detent 48. When moving from differential lock position (FIG. 4), into low gear range (FIG. 5) the 37° angle at wall 48a allows pin 39 to snap into detent 48 quickly causing disengagement of pin 39. When shifting from differential locked position into high gear range (FIG. 6) wall 48a at 40° allows a more gradual entrance of pin 39 into detent 48 since it is not necessary to rapidly disconnect from link 60.

While stop adjustment screws may be provided to limit rotation of lever arms 40 and 50 into the various positions, it is preferred to rely on the travel of the transfer case linkage mechanisms to limit the travel of the lever arms. When shifting lever arms 50 into either high or low differential locked positions it is, of course, necessary that the gear range selector lever arm 40 stop at some point at which time selector pin 39 rides out of detent 48, disconnecting from arm 40, and beginning its engagement with lever arm 50. The linking mechanism of the transfer case effectively serve as stops therefore eliminating the need for separate stop adjustments on the transfer case mechanism.

From the foregoing description, it may readily be seen by those skilled in the art that the present invention provides a novel shifting assembly for transfer case gearing wherein a first lever arm is shiftable between a plurality of positions while a second lever arm is shifted upon operation of the first to assume either one of two positions through the use of a linking mechanism. The apparatus of the invention, therefore, provides a straight-line shifter assembly and eliminates the need for two or more shifting mechanisms to shift the gearing in a transfer case. Accuracy of positioning and operator "feel" when shifting together with positive locking when in a differential locked position are provided by the vertically movable restrictor plate member. The structure of the invention is relatively low in cost since the parts thereof readily lend themselves to formation as by stamping. It is further relatively easy to assemble thereby resulting in cost savings not only because of the reduced cost of the parts themselves but also in the labor costs. Those skilled in the art will, of course, readily appreciate the many advantages of the present invention over that shown in the prior art and will also recognize that many modifications may be made. It is, therefore, intended that the equivalent arrangements are to be included as part of this invention unless the following claims by their wording expressly state otherwise.

The embodiments of the invention in which an exclusive property or privilege is claimed are defined as follows.

1. In a shifting apparatus for a transfer case in a vehicle, said shifting apparatus including a first lever arm for shifting the gear range of the transfer case, a second lever arm for shifting the differential of the transfer case between operative and inoperative positions, and a selector lever for operating said first and second lever arms; means mounting said lever arms and said selector lever for rotation about a common axis; and means selectively interconnecting said selector lever to said first lever arm for actuating the same to "HI" and "LO" positions on each side of a neutral position in response to movement of said selector lever to "HI" and "LO" positions, respectively; and means selectively interconnecting said selector lever to said second lever arm for actuating the same to a "LOC" position, in response to movement of said selector lever to either "HI LOC" or "LO LOC" positions on each side of a neutral position; the improvement comprising:

said means for selectively interconnecting said selector lever to said first and said second lever arms including a selector pin mounted on said selector lever for relative sliding movement along a portion of the length of said selector lever whereby said selector pin can be engaged and disengaged from said lever arms; and cam means for causing such sliding movement of said selector pin in response to various positions of said selector lever.

2. The shifting assembly of claim 1 wherein said cam means is formed in said first and said second lever arms, said cam means in said first lever arm including a centrally located engaging surface and a pair of oppositely directed dwell areas, said selector pin operatively connected to said engaging surface during shifting of said first lever arm between "HI" and "LO" positions, said selector pin slidable into said oppositely directed dwell areas disengaging said selector pin from said first lever arm and operatively engaging said pin with said second lever arm with sliding movement of said selector pin along said selector lever with movement of said selector lever to "HI LOC" and "LO LOC" positions.

3. The shifting assembly of claim 2 and further including said cam means on said second lever arm having a dwell portion in general alignment with said dwell portion on said first lever arm and an engaging portion extending downwardly from said dwell portion; said cam means on said second lever receiving said selector pin with movement of said selector lever to "LOC" position adjacent one of said "HI" and "LO" positions to thereby move said second lever to a differential operative position with disengagement of said selector pin from said engaging surface in said first lever arm and into one of said pair of oppositely directed dwell portions.

4. The shifting assembly of claim 3 and further including a linking member pivotally mounted on a second axis parallel to said common axis, said linking member having a pin extending therefrom engaging said second lever intermediate said common axis and said cam means on said second lever, said linking member having a third cam surface formed therein, said third cam surface having a dwell portion in general alignment with the other of said oppositely directed dwell portions on said first lever arm, and an engaging portion extending downwardly from said dwell portion; said third cam surface receiving said selector pin with movement of said selector lever to a "LOC" position adjacent the other of said "HI" and "LO" positions to urge said linking member to pivot about said second axis thereby urging said second lever arm into differential operative position with disengagement of said selector pin from said engaging surface in said first lever arm and into the other of said pair of oppositely directed dwell portions.

5. The shifting assembly of claim 4 and further including guide means positioned between said linking member and said first lever arm, said guide means having an elongated slot formed therein to receive said selector pin for movement therewith, said slot extending generally along the length of said oppositely directed dwell portions of said cam means in said first lever arm, said guide means being shiftable by said selector pin when said selector pin is urged into said engaging surface of said cam means; said guide means having an L-shaped slot formed therein receiving said pin on said linking member, said L-shaped slot having wall surface areas abutting said pin to prevent pivotal movement of said linking member when said guide means is shifted in a first direction, the horizontal leg of said L-shaped slot allowing movement of said linking member only when said guide means is urged in the opposite direction with movement of said first lever and said second lever arm into "HI LOC" and "LO LOC" positions.

6. In a shifting apparatus for a vehicle transfer case including a selector lever movable from neutral position to four different positions, two on each side of neutral position; said positions being in sequential order from neutral position to "LO" and "LO LOC" on one side of neutral position and to "HI" and "HI LOC" on the other side of neutral position; a gear lever mounted for movement from a neutral gear position to a high gear (HI) position on one side of neutral position and low gear (LO) position on the other side of neutral position; a differential shift lever mounted for movement from an unlocked position to a locked (LOC) position; means for selectively interconnecting said selector lever to either of said gear lever or differential lever; said means including a selector pin movable with said selector lever adapted to engage said gear lever and move the same in the same direction as said pin to HI or LO gear positions; said selector pin also adapted to engage said differential lever and in one direction of movement of said pin adapted to move said lever in the same direction as said pin to LOC position; a reverse linkage member mounted for operatively connecting said selector pin to said differential lever and moving the same in said one direction to LOC position upon movement of said pin in an opposite direction to said one direction; and a floating plate member for preventing movement of said differential lever into LOC position until after said gear lever has been shifted to either LO or HI positions, said plate member mounted for movement in response to the movement of said selector pin and in relation to said gear lever and said differential lever, said plate member being shiftable to a first position by said selector pin when said pin is moved to engagement position with said gear lever and in said first position having means for holding said differential lever from movement into LOC position while said gear lever is moved into HI and LO positions; said plate member also being shiftable to at least one different position by said pin in response to movement of said pin and having means in said different position for allowing movement of said differential lever into LOC position with movement of said selector lever into either HI LOC or LO LOC positions, whereby a smooth straight-line transition of the movement of said selector lever through all of said five positions from "NEUTRAL" to "HI" to "HI LOC" and from "NEUTRAL" to "LO" to " LO LOC," and vice versa, is provided.

7. The shifting apparatus of claim 6 and further including means mounting said selector pin for relative sliding movement along a portion of the length of said selector lever whereby said selector pin can be engaged and disengaged from said lever arms; and cam means for causing such sliding movement of said selector pin in response to various positions of said selector lever.

8. The shifting assembly of claim 7 wherein said cam means is formed in said gear lever and said differential lever, said cam means in said gear lever arm including a centrally located engaging surface and a pair of oppositely directed dwell areas, said selector pin operatively connected to said engaging surface during shifting of said gear lever arm between "HI" and "LO" positions, said selector pin slidable into said oppositely directed dwell areas disengaging said selector pin from said gear lever arm and operatively engaging said pin with said differential lever arm with sliding movement of said selector pin along said selector lever with movement of said selector lever into "HI LOC" and "LO LOC" positions.

9. The shifting assembly of claim 8 and further including said cam means on said differential lever arm having a dwell portion in general alignment with said dwell portion on said gear lever arm and an engaging portion extending downwardly from said dwell portion; said cam means on said differential lever receiving said selector pin with movement of said selector lever to "LOC" position adjacent one of said "HI" and "LO" positions to thereby move said differential lever to a differential operative position with disengagement of said selector pin from said engaging surface in said gear lever arm and into one of said pair of oppositely directed dwell portions.

10. The shifting apparatus of claim 9 wherein said reverse linkage member is pivotally mounted for rotation about an axis transverse to the direction of movement of said selector, gear and differential levers, said linkage member having a pin extending therefrom engaging said differential lever intermediate said common axis and said cam means on said differential lever, said linkage member having a third cam surface formed therein, said third cam surface having a dwell portion in general alignment with the other of said oppositely directed dwell portions on said gear lever arm, and an engaging portion extending downwardly from said dwell portion; said third cam surface receiving said selector pin with movement of said selector lever to a "LOC" position adjacent the other of said "HI" and "LO" positions to urge said linkage member to pivot about said differential axis thereby urging said differential lever arm into differential operative position with disengagement of said selector pin from said engaging surface in said gear lever arm and into the other of said pair of oppositely directed dwell portions.

11. The shifting assembly of claim 10 wherein said plate member is positioned between said linkage member and said gear lever, said holding means including an elongated slot formed in said plate member to receive said selector pin, said slot extending generally along the length of said oppositely directed dwell portions of said cam means in said gear lever arm, said plate member being shiftable by said selector pin in said elongated slot when said selector pin is urged into said engaging surface of said cam means; said plate member having an L-shaped slot formed therein receiving said pin on said linkage member, said L-shaped slot having wall surface areas abutting said pin to prevent pivotal movement of said linkage member and said differential lever when said plate member is shifted to said first position, the horizontal leg of said L-shaped slot allowing movement of said linkage member only when said plate member is urged into said different position with movement of said gear lever and said differential lever into "HI LOC" and "LO LOC" positions.

12. In a shifting apparatus for a transfer case in a vehicle, said shifting apparatus including a housing, a first lever arm for shifting the gear range of the transfer case, a second lever arm for shifting the differential of the transfer case between operative and inoperative positions, and a selector lever for operating said first and second lever arms; means mounting said lever arms and said selector lever in said housing for rotation about a common axis; and cam surface means in each of said first and said second lever arms selectively engageable to move said lever arms about said common axis as said selector is rotated; the improvement comprising:
   a selector pin mounted on said selector lever, said pin being spaced from said common axis and extending parallel thereto;
   means mounting said selector pin for vertical movement with respect to said selector lever and normal to said common axis for selective connection with cam means on said first and said second lever arms;

guide means connected to said selector pin and mounted for sliding vertical movement with respect to said housing, said guide means shiftable upwardly with movement of said selector pin to move said first lever arm between first and second positions with movement of said selector to first and second positions from a neutral position and shiftable downwardly with disengagement of said selector pin from said first lever arm into engagement with said second lever with movement of said selector to third and fourth positions adjacent said first and second positions.

13. The shifting apparatus of claim 12 wherein said mounting means includes an enclosure formed on said selector and a plate member slidably mounted in said enclosure, said selector pin fixed on said plate member and movable therewith; and means biasing said plate member and said pin toward said common axis.

14. The shifting apparatus of claim 13 and further including a linking member pivotally mounted about a second axis parallel to said common axis, said linking member operatively connected to said second lever, cam means in said linking member operatively engageable with said selector pin with rotation of said selector lever to one of said third and fourth positions.

15. The shifting apparatus of claim 14 and further including an arm member on said linking member engaging said second lever arm, said guide member having an L-shaped slot formed herein receiving and guiding said arm member, said slot having vertical wall surfaces abutting said arm to prevent pivotal movement of said linking member when said guide means is shifted vertically upwardly, the horizontal leg of said L-shaped slot allowing pivotal movement of said linking member only when said guide member is urged downwardly with movement of said selector to engage said selector pin with said second lever arm.

16. The shifting assembly of claim 15 wherein said cam surface means on said first lever arm includes a centrally located upwardly extending engaging surface and a pair of oppositely directed dwell areas, said biasing means operatively connecting said selector pin with said engaging surface during shifting of said first lever arm between said first and second positions, said selector pin movable into said oppositely directed dwell areas, disengaging said selector pin from said lever arm and operatively engaging said pin with said second lever arm with downward movement of said selector pin with movement of said selector into said third and fourth positions.

17. A straight-line shifting assembly for a transfer case in a vehicle, the transfer case having high and low gear range drive means and a selectively lockable differential, said shifting assembly comprising:

a housing;

a selector, a gear range lever arm, and a differential shift lever arm pivotally mounted in said housing for rotation about a common axis;

first cam surface means formed in said gear range lever arm, said cam surface means having an upwardly extending engaging surface and a pair of oppositely directed dwell areas;

a cam follower mounted on said selector, said cam follower being mounted for vertical movement with respect to said selector normal to said common axis, said cam follower extending parallel to said common axis into said cam surface means in said gear range lever arm;

means on said selector biasing said cam follower into said engaging surface for movement of said gear range lever arm with movement of said selector between first and second positions, either side of a neutral position;

said differential shift lever having second cam surface means formed therein, said second cam surface having a dwell portion in general alignment with said dwell portion on said gear range lever arm and an engaging portion extending downwardly from said dwell portion; said second cam surface receiving said cam follower with movement of said selector arm to a third position adjacent said first position remote from said neutral position to thereby move said differential shift lever to a differential locking position with disengagement of said cam follower from said engaging surface in said gear range lever arm and into one of said pair of oppositely directed dwell portions;

a linking member pivotally mounted on said housing about a second axis, said linking member having a pin extending outwardly therefrom parallel to said common axis and engaging said differential shift lever intermediate said common axis and said second cam surface, said linking member having a third cam surface formed therein, said third cam surface having a dwell portion in general alignment with the other of said oppositely directed dwell portions on said gear range lever arm, and an engaging portion extending downwardly from said dwell portion; said third cam surface receiving said cam follower with movement of said selector to a fourth position adjacent said second position remote from said neutral position to urge said linking member to pivot about said second axis thereby urging said differential shift lever into said differential locking position with disengagement of said follower from said engaging surface in said gear range lever arm and into the other of said pair of oppositely directed dwell portions;

guide means positioned between said linking member and said gear range lever arm, said guide means having an elongated slot formed therein to receive and guide said cam follower, said slot extending generally along the length of said oppositely directed dwell portions of said first mentioned cam surface in said gear range lever arm, said guide member being shiftable vertically upwardly by said cam follower when said cam follower is biased into said engaging surface of said first cam surface means; said guide member having an L-shaped slot formed thereon receiving said pin on said linking member, said slot having wall surface areas abutting said pin to prevent pivotal movement of said linking member when said guide means is shifted vertically upwardly, the horizontal leg of said L-shaped slot allowing movement of said linking member only when said guide means is urged vertically downwardly with movement of said selector into said third and fourth positions to thereby provide a smooth, straight-line transition of the movement of said selector through all of said positions.

18. In a shifting apparatus for a vehicle transfer case including a selector lever movable from neutral position to four different positions, two on each side of neutral position; said positions being in sequential order from neutral position to "LO" and "LO LOC" on one side of neutral position and to "HI" and "HI LOC" on the other side of neutral position; a gear lever mounted for movement from a neutral gear position to a high gear (HI) position on one side of neutral position and low gear (LO) position on the other side of neutral position; a differential shift lever mounted for movement from an unlocked position to a locked (LOC) position; selector means for operatively connecting said selector lever to either said gear lever or differential lever, said selector means including a selector pin mounted on and movable with said selector lever; said gear lever having a first recess; said pin being operatively connected to said gear lever by means of being positioned in said first recess and in said position being adapted for actuation of said gear lever in opposite directions corresponding to the direction of movement of said pin; said pin being operatively connected to said differential lever for actuation thereof to LOC position by being selectively positioned in either one of a second or third recess, said second recess being located in said differential lever below and on one side of said first recess and adapted to receive said selector pin for actuation of said differential lever in the same direction as said pin; said third recess being located below and to the other side of said first recess in a reverse linkage member operatively connected to said differential lever; said third recess receiving said pin for actuating said reverse linkage member in the same direction as said pin, said linkage member being adapted to transmit its movement to said differential lever but in an opposite direction; means for causing said selector pin to move from said first recess into one of said second or third recesses after said gear lever is shifted to HI position; means for causing said selector pin to move from said first recess into the other of said second or third recesses after said gear lever is shifted to LO position; and overlapping surfaces on said differential lever and reverse linkage member between said second and third recesses for preventing said pin from hanging up between said differential lever and said reverse linkage member as said pin moves from said first recess to either of said second and third recesses.

19. The shifting apparatus of claim 18 in which said first recess has a central pin receiving portion with cam surfaces on each side thereof, said cam surfaces having a sufficient incline to hold said pin within said central portion while said gear lever is being actuated by said pin to HI or LO positions but permitting said pin to cam over one of said surfaces when said gear lever has been shifted to HI position and to cam over the other of said surfaces when said gear lever has been shifted to LO position.

20. The shifting apparatus of claim 19 in which said cam surfaces of said recess are positioned to cam said selector pin into positions for entering into either of said second or third recesses without binding.

21. The shifting apparatus of claim 20 in which a restrictor plate is provided for causing said surfaces to be overlapped during the movement of said selector pin from said first recess to either of said second and third recesses.

* * * * *